(12) United States Patent
Tsubouchi (10) Patent No.: US 9,931,910 B2
(45) Date of Patent: Apr. 3, 2018

(54) ADSORPTION HEAT PUMP-EQUIPPED VEHICLE AIR CONDITIONING DEVICE

(71) Applicant: TOYOTA JIDOSHA KABUSHIKI KAISHA, Toyota-shi, Aichi-ken (JP)

(72) Inventor: Masakatsu Tsubouchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/288,365

(22) Filed: Oct. 7, 2016

(65) Prior Publication Data

US 2017/0144509 A1    May 25, 2017

(30) Foreign Application Priority Data

Nov. 20, 2015 (JP) ................................. 2015-227858

(51) Int. Cl.
*B60H 1/32* (2006.01)
*B60H 1/00* (2006.01)

(52) U.S. Cl.
CPC ....... *B60H 1/3201* (2013.01); *B60H 1/00007* (2013.01); *B60H 1/00899* (2013.01); *B60H 2001/00935* (2013.01)

(58) Field of Classification Search
CPC .............. B60H 1/3201; B60H 1/00007; B60H 1/00899; B60H 2001/00935
See application file for complete search history.

(56) References Cited

FOREIGN PATENT DOCUMENTS

| JP | H10-166844 | A | 6/1998 | | |
|----|-----------|---|--------|---|---|
| JP | H11-083235 | A | 3/1999 | | |
| JP | 2000-177374 | A | 6/2000 | | |
| JP | 2001-213149 | | * 8/2001 | ............... | B60H 1/32 |
| JP | 2008-008582 | A | 1/2008 | | |
| JP | 2013-049311 | A | 3/2013 | | |

OTHER PUBLICATIONS

English Translation, JP 2001-213149, Suzuki et al.*

* cited by examiner

*Primary Examiner* — Cassey D Bauer
(74) *Attorney, Agent, or Firm* — Oliff PLC (57) ABSTRACT

An adsorption heat pump-equipped vehicle air conditioning device comprising: an adsorption heat pump that includes a plurality of vessels, each of which includes an adsorption section housing an adsorbent and an evaporation and condensation section inside which a refrigerant is sealed, an adsorption process and a desorption process being performed repeatedly inside the vessels; first heat exchangers respectively disposed inside each of the adsorption sections; second heat exchangers respectively disposed inside each of the evaporation and condensation sections; a first circulation route for circulating refrigerant between a high temperature heat source and a heater core; a second circulation route for circulating refrigerant between the adsorption heat pump and an interior heat exchanger, wherein the second circulation route is connected to the adsorption heat pump through a switching valve; and a controller that controls switching of the switching valve.

5 Claims, 6 Drawing Sheets

ADSORPTION HEAT PUMP-EQUIPPED VEHICLE AIR CONDITIONING DEVICE

CROSS-REFERENCE TO RELATED APPLICATION

This application is based on and claims priority under 35 USC 119 from Japanese Patent Application No. 2015-227858 filed on Nov. 20, 2015, the disclosure of which is incorporated by reference herein.

TECHNICAL FIELD

The present invention relates to an adsorption heat pump-equipped vehicle air conditioning device.

BACKGROUND ART

A vehicle air conditioning device described in Japanese Patent Application Laid-Open (JP-A) No. 2000-177374 is equipped with an adsorption heat pump, and uses the adsorption heat pump to cool the vehicle. The vehicle air conditioning device is moreover configured so as to utilize a heat exchanger external to the vehicle cabin to cool liquid refrigerant circulating around an adsorption vessel of the adsorption heat pump, so as to cool liquid refrigerant in the engine. Specifically, when the liquid refrigerant in the engine reaches a specific temperature or greater, the liquid refrigerant for cooling the engine is cooled by an engine cooling radiator and the heat exchanger external to the vehicle cabin. This thereby enables a reduction in the size of the engine cooling radiator.

JP-A No. 2008-008582 describes a related adsorption type space heating/hot water supply device.

However, in the vehicle air conditioning device described above, the adsorption heat pump is not actively utilized when heating. The above vehicle air conditioning device that employs an adsorption heat pump described above accordingly leaves room for improvement from the perspective of improving heating efficiency.

In consideration of the above circumstances, an object of the present invention is to provide an adsorption heat pump-equipped vehicle air conditioning device capable of improving heating efficiency.

SUMMARY

An adsorption heat pump-equipped vehicle air conditioning device of a first aspect relating to the present invention comprising: an adsorption heat pump that includes a plurality of vessels, each of which includes an adsorption section housing an adsorbent and an evaporation and condensation section inside which a refrigerant is sealed, an adsorption process and a desorption process being performed repeatedly inside the vessels; first heat exchangers respectively disposed inside each of the adsorption sections; second heat exchangers respectively disposed inside each of the evaporation and condensation sections; a first circulation route for circulating refrigerant between a high temperature heat source and a heater core; a second circulation route for circulating refrigerant between the adsorption heat pump and an interior heat exchanger, wherein the second circulation route is connected to the adsorption heat pump through a switching valve; and a controller that controls switching of the switching valve, and that, when required to heat, connects the second heat exchanger on a desorption process side to the second circulation route through the switching valve, or connects the first heat exchanger on an adsorption process side to the second circulation route through the switching valve.

In the adsorption heat pump-equipped vehicle air conditioning device configured as described above, the adsorption heat pump is configured including the plural vessels. Each vessel includes the adsorption section housing the adsorbent and the evaporation and condensation section inside which the refrigerant is sealed. The first heat exchanger is disposed inside the adsorption section, and the second heat exchanger is disposed inside the evaporation and condensation section. An adsorption process and a desorption process are performed repeatedly inside the respective vessels.

The vehicle air conditioning device further includes the first circulation route for circulating refrigerant between the high temperature heat source and the heater core, and the second circulation route that is connected to the adsorption heat pump through the switching valve, and the second circulation route is for circulating refrigerant between the adsorption heat pump and the interior heat exchanger. Configuration is made such that the controller controls switching of the switching valve.

When required to heat, the controller connects the second heat exchanger on the desorption process side to the second circulation route through the switching valve, or connects the first heat exchanger on the adsorption process side to the second circulation route through the switching valve. Accordingly, in cases in which the second heat exchanger where the desorption process is being performed is connected to the second circulation route through the switching valve, the heat of condensation generated by the refrigerant during the desorption process can be utilized as an auxiliary heat source. Namely, when required to heat, the heat of condensation can be utilized as an auxiliary heat source in addition to the high temperature heat source. In cases in which the first heat exchanger where the adsorption process is being performed is connected to the second circulation route through the switching valve, the heat of adsorption of the adsorbent that is adsorbed in the first heat exchanger can be utilized as an auxiliary heat source. Namely, when required to heat, the heat of adsorption can be utilized as an auxiliary heat source in addition to the high temperature heat source. This thereby enables the heating efficiency of the vehicle air conditioning device to be improved.

The adsorption heat pump-equipped vehicle air conditioning device of a second aspect relating to the present invention, further comprising a third circulation route for circulating refrigerant between the adsorption heat pump and a radiator, the third circulation route being connected to the adsorption heat pump through the switching valve, wherein: the switching valve includes a first switching valve that connects to the first heat exchangers, and a second switching valve that connects to the second heat exchangers; when required to cool, the controller connects the first heat exchanger on the adsorption process side to the third circulation route through the first switching valve and connects the second heat exchanger on the adsorption process side to the second circulation route through the second switching valve, and also connects the first heat exchanger on the desorption process side to the first circulation route through the first switching valve and connects the second heat exchanger on the desorption process side to the third circulation route through the second switching valve; and when required to heat, the controller connects the first heat exchanger and the second heat exchanger on the adsorption process side to the third circulation route through the first switching valve and the second switching valve, and also connects the first heat exchanger on the desorption process side to the first circulation route through the first switching valve and connects the second heat exchanger on the desorption process side to the second circulation route through the second switching valve.

In the adsorption heat pump-equipped vehicle air conditioning device configured as described above, the controller controls switching of the first switching valve and the second switching valve when switching from being required to cool to being required to heat. This thereby enables the second heat exchanger where the desorption process is being performed and the second circulation route to be connected through the switching valve. This thereby enables the switch from being required to cool to being required to heat to be achieved with a simple configuration.

The adsorption heat pump-equipped vehicle air conditioning device of a third aspect relating to the present invention, further comprising a third circulation route for circulating refrigerant between the adsorption heat pump and a radiator, the third circulation route being connected to the adsorption heat pump through the switching valve, wherein: the switching valve includes a first switching valve that is connected to the first heat exchangers, a second switching valve that is connected to the second heat exchangers, and a third switching valve that is coupled to the first switching valve and the second switching valve; when required to cool, the controller connects the first heat exchanger on the adsorption process side to the third circulation route through the first switching valve and the third switching valve and connects the second heat exchanger on the adsorption process side to the second circulation route through the second switching valve and the third switching valve, and also connects the first heat exchanger on the desorption process side to the first circulation route through the first switching valve and connects the second heat exchanger on the desorption process side to the third circulation route through the second switching valve; and when required to heat, the controller connects the first heat exchanger on the adsorption process side to the second circulation route through the first switching valve and the third switching valve and connects the second heat exchanger on the adsorption process side to the third circulation route through the second switching valve and the third switching valve, and also connects the first heat exchanger on the desorption process side to the first circulation route through the first switching valve and connects the second heat exchanger on the desorption process side to the third circulation route through the second switching valve.

In the adsorption heat pump-equipped vehicle air conditioning device configured as described above, the controller controls switching of the first switching valve, the second switching valve, and the third switching valve when switching from being required to cool to being required to heat. This thereby enables the first heat exchanger where the adsorption process is being performed and the second circulation route to be connected through the switching valve. This thereby enables the switch from being required to cool to being required to heat to be achieved with a simple configuration.

The adsorption heat pump-equipped vehicle air conditioning device of a fourth aspect relating to the present invention, wherein, when required to heat, the controller switches the second switching valve and the third switching valve so as to connect the first heat exchanger on the adsorption process side to the third circulation route through the first switching valve and the third switching valve and so as to connect the second heat exchanger on the adsorption process side to the third switching valve, and also so as to connect the first heat exchanger on the desorption process side to the first circulation route through the first switching valve and so as to connect the second heat exchanger on the desorption process side to the second circulation route through the second switching valve and the third switching valve.

In the adsorption heat pump-equipped vehicle air conditioning device configured as described above, when required to heat, the controller switches the second switching valve and the third switching valve, thereby enabling switching of a connected state of the second heat exchanger on the adsorption process side and the second circulation route to a connected state of the second heat exchanger on the desorption process side to the second circulation route. This thereby enables the auxiliary heat source to be switched between utilizing the heat of adsorption and utilizing the heat of condensation.

The adsorption heat pump-equipped vehicle air conditioning device of a fifth aspect relating to the present invention, wherein the switching valve is configured by a four-way valve.

The adsorption heat pump-equipped vehicle air conditioning device configured as described above enables switching between the processes inside the respective vessels to be switched by a simple configuration due to configuring the switching valve as a four-way valve.

Advantageous Effects of Invention

The adsorption heat pump-equipped vehicle air conditioning device of the first aspect of the present invention enables an improvement in heating efficiency.

The adsorption heat pump-equipped vehicle air conditioning device of the second aspect and the third aspect of the present invention enables switching from being required to cool to being required to heat to be achieved with a simple configuration.

The adsorption heat pump-equipped vehicle air conditioning device of the fourth aspect of the present invention enables the auxiliary heat source to be switched between utilizing the heat of adsorption and utilizing the heat of condensation.

The adsorption heat pump-equipped vehicle air conditioning device of the fifth aspect of the present invention enables switching between processes in the vessels with a simple configuration.

BRIEF DESCRIPTION OF DRAWINGS

Exemplary embodiments of the present invention will be described in detail based on the following figures, wherein.

DETAILED DESCRIPTION

First Exemplary Embodiment

Figure 1:
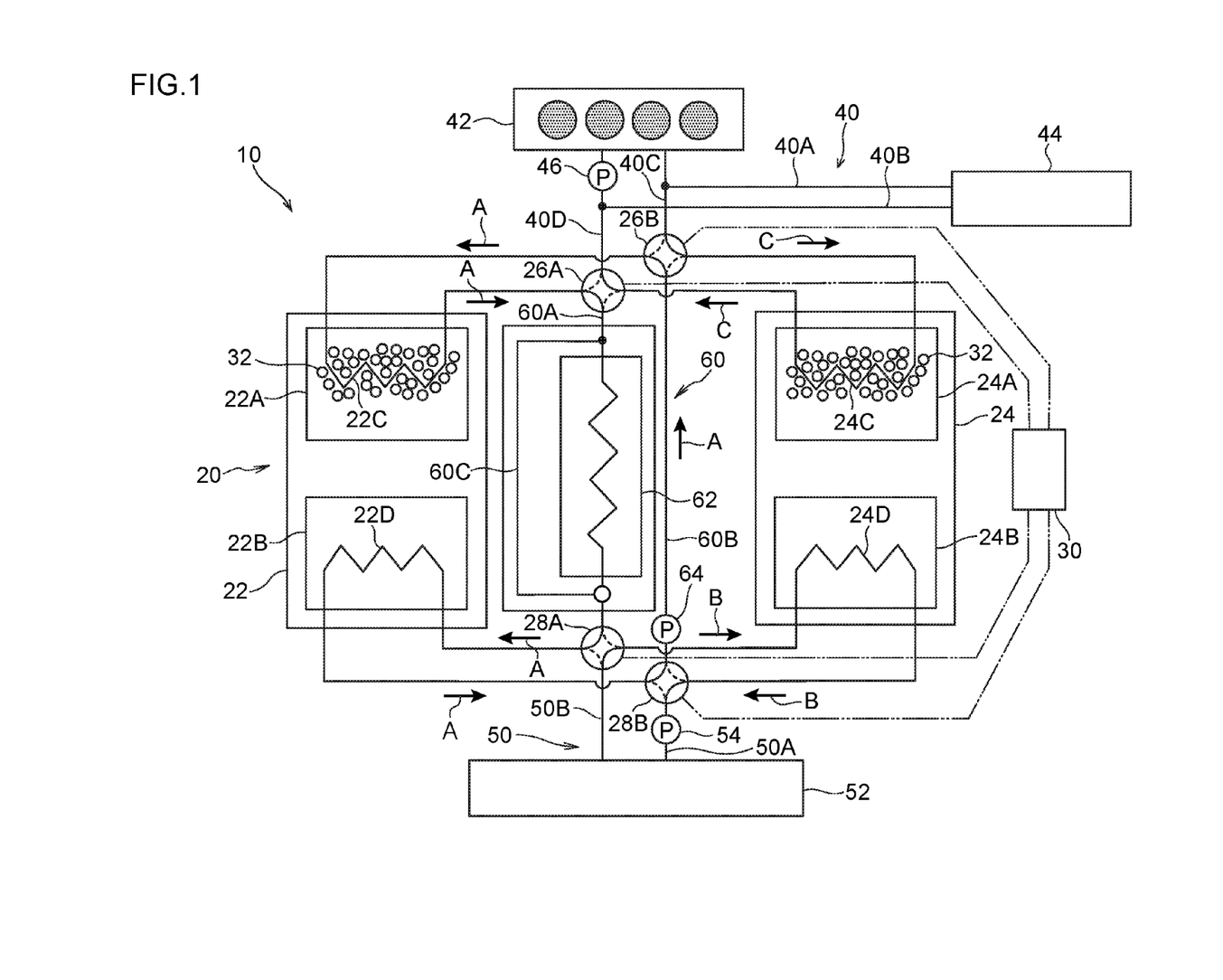
FIG. 1 is a configuration diagram illustrating a state of an adsorption heat pump-equipped vehicle air conditioning device according to a first exemplary embodiment when required to heat.
Figure 2:
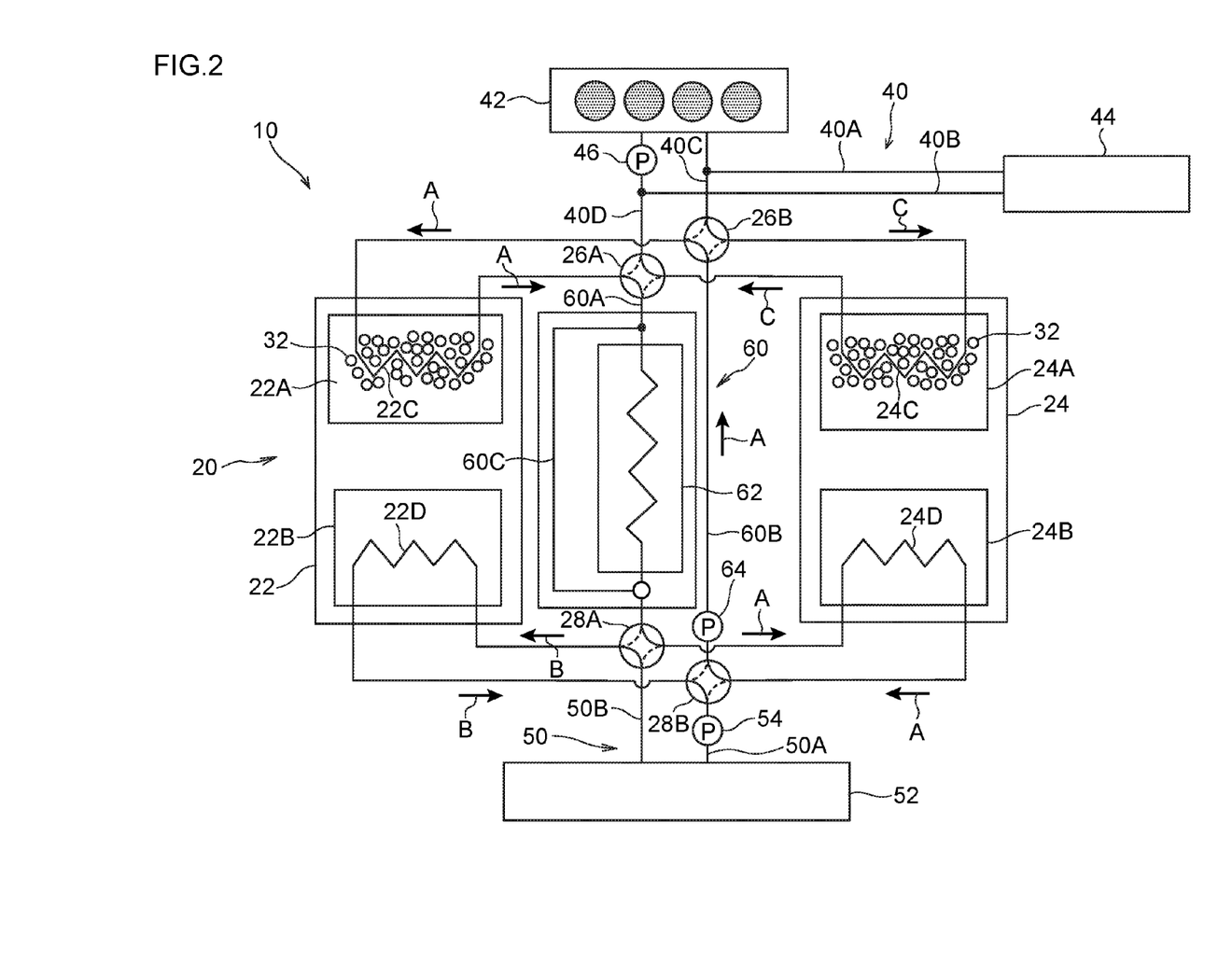
FIG. 2 is a configuration diagram illustrating a state of the adsorption heat pump-equipped vehicle air conditioning device illustrated in FIG. 1 when required to cool.

Explanation follows regarding a vehicle air conditioning device 10 provided with an adsorption heat pump (referred to below as the vehicle air conditioning device 10) according to a first exemplary embodiment, with reference to FIG. 1 to FIG. 3. As illustrated in FIG. 1 and FIG. 2, the vehicle air conditioning device 10 is configured as an air conditioning device provided with an adsorption heat pump 20. The vehicle air conditioning device 10 is configured including: a first circulation route 40 for circulating a refrigerant (cooling water) between an engine 42, serving as a "hot heat source", and a heater core 44; a second circulation route 50 for circulating a refrigerant (cooling water) between the adsorption heat pump 20 and an interior heat exchanger 52; and a third circulation route 60 for circulating a refrigerant (cooling water) between the adsorption heat pump 20 and a radiator 62. In the following explanation, the adsorption heat pump 20 will be described first, followed by description regarding the vehicle air conditioning device 10. Note that, for example, a cooler core is employed as the interior heat exchanger 52.

Adsorption Heat Pump 20

The adsorption heat pump 20 includes plural vessels (two in the present exemplary embodiment). An adsorption process is performed in one of the vessels, and a desorption process is performed in the other vessel. Namely, in the one vessel, a refrigerant (water) is adsorbed by an adsorbent 32, and the latent heat of evaporation generated by evaporation of the refrigerant accompanying adsorption of the refrigerant by the adsorbent 32 is utilized to obtain cooling water cooled to a cold temperature. In the other vessel, the adsorbent 32 that has adsorbed the refrigerant (water) is heated, thereby desorbing the refrigerant (water) from the adsorbent 32. Specific explanation follows regarding this.

The adsorption heat pump 20 is configured including a first adsorption section 22A and a second adsorption section 24A, serving as "adsorption sections", and a first evaporation and condensation section 22B and a second evaporation and condensation section 24B, serving as "evaporation and condensation sections". The first adsorption section 22A and the first evaporation and condensation section 22B form a pair and configure a first vessel 22, serving as a "vessel", and inside the first vessel 22 is sealed tightly. The second adsorption section 24A and the second evaporation and condensation section 24B form a pair and configure a second vessel 24, serving as a "vessel", and inside the second vessel 24 is sealed tightly.

The adsorbent 32 is housed inside the first adsorption section 22A and the second adsorption section 24A respectively. The adsorbent 32 is configured by silica gel, a zeolite, or the like (a zeolite in the present exemplary embodiment). A first adsorption core 22C (heat exchanger), serving as a "first heat exchanger", is disposed inside the first adsorption section 22A, and the first adsorption core 22C is connected to four-way valves 26A, 26B, serving as "first switching valves". A controller 30 (see FIG. 1) is electrically connected to the four-way valves 26A, 26B, and the controller 30 is configured to control switching of the four-way valves 26A, 26B. The four-way valves 26A, 26B accordingly function as switching valves. The first adsorption core 22C is connected to either the first circulation route 40 or the third circulation route 60, described later, through the four-way valves 26A, 26B.

Similarly to the first adsorption section 22A, a second adsorption core 24C (heat exchanger), serving as a "first heat exchanger", is disposed inside the second adsorption section 24A. The second adsorption core 24C is connected to the four-way valves 26A, 26B, and is connected to either the first circulation route 40 or the third circulation route 60, described later, through the four-way valves 26A, 26B. Cooling water flowing inside the first circulation route 40 or inside the third circulation route 60 circulates through the first adsorption core 22C and through the second adsorption core 24C.

Refrigerant (cooling water in the present exemplary embodiment) is sealed inside the first evaporation and condensation section 22B and the second evaporation and condensation section 24B. A first evaporation and condensation core 22D (heat exchanger), serving as a "second heat exchanger", is disposed inside the first evaporation and condensation section 22B. Four-way valves 28A, 28B, serving as "second switching valves", are connected to the first evaporation and condensation core 22D. The controller 30 mentioned above is electrically connected to the four-way valves 28A, 28B, and the controller 30 is configured to control switching of the four-way valves 28A, 28B. The four-way valves 28A, 28B accordingly function as switching valves. The first evaporation and condensation core 22D is connected to either the second circulation route 50 or the third circulation route 60, described later, through the four-way valves 28A, 28B.

Similarly to the first evaporation and condensation section 22B, a second evaporation and condensation core 24D (heat exchanger), serving as a "second heat exchanger", is disposed inside the second evaporation and condensation section 24B. Configuration is made such that the second evaporation and condensation core 24D is connected to the four-way valves 28A, 28B, and is connected to either the second circulation route 50 or the third circulation route 60, described later, through the four-way valves 28A, 28B. Cooling water flowing inside the second circulation route 50 or inside the third circulation route 60 circulates through the first evaporation and condensation core 22D and through the second evaporation and condensation core 24D.

First Circulation Route 40

The first circulation route 40 connects together the engine 42 and the heater core 44, this being a heat exchanger, and configures a route for circulating cooling water between the two. The heater core 44 configures part of an interior air conditioning unit 70. The interior air conditioning unit 70 is described later. The first circulation route 40 includes an upstream side pipe 40A configuring an upstream side portion of the first circulation route 40, and a downstream side pipe 40B configuring a downstream side portion of the first circulation route 40. The engine 42 and the heater core 44 are connected together by the upstream side pipe 40A and downstream side pipe 40B. High temperature (for example, at 90° C.) cooling water is thereby supplied to the heater core 44.

The first circulation route 40 further includes branched pipes 40C, 40D. The branched pipe 40C branches at an intermediate portion of the upstream side pipe 40A and is connected to the four-way valve 26B. The branched pipe 40D extends out from the four-way valve 26A, and is connected to an intermediate portion of the downstream side pipe 40B. The branched pipe 40D is provided with a first pump 46 for circulating the cooling water. High temperature cooling water is thereby supplied to either the first adsorption core 22C or the second adsorption core 24C, and configuration is made such that a desorption process is performed in either the first adsorption section 22A or the second adsorption section 24A.

Second Circulation Route 50

The second circulation route 50 connects together the adsorption heat pump 20 and the interior heat exchanger 52, this being a heat exchanger, and configures a route for circulating cooling water between the two. The interior heat exchanger 52 configures part of the interior air conditioning unit 70. The interior air conditioning unit 70 is described later. The second circulation route 50 includes an upstream side pipe 50A configuring an upstream side portion of the second circulation route 50, and a downstream side pipe 50B configuring a downstream side portion of the second circulation route 50. The adsorption heat pump 20 and the interior heat exchanger 52 are connected together by the upstream side pipe 50A and the downstream side pipe 50B. Specifically, the upstream side pipe 50A is connected to the four-way valve 28B, and the downstream side pipe 50B is connected to the four-way valve 28A. The upstream side pipe 50A is provided with a second pump 54 for circulating the cooling water.

Third Circulation Route 60

The third circulation route 60 connects together the adsorption heat pump 20 and the radiator 62, this being a heat exchanger, and configures a route for circulating cooling water between the two. The radiator 62 is disposed at a front end portion of a vehicle engine room, and is configured as a separate heat exchanger to an engine cooling radiator. The third circulation route 60 includes an upstream side pipe 60A configuring an upstream side portion of the third circulation route 60, and a downstream side pipe 60B configuring a downstream side portion of the third circulation route 60. The upstream side pipe 60A couples between the four-way valve 26A and the four-way valve 28A, and the downstream side pipe 60B couples between the four-way valve 28B and the four-way valve 26A. The radiator 62 is provided at an intermediate portion of the upstream side pipe 60A, and the cooling water circulating through the upstream side pipe 60A is configured so as to be cooled to a cool temperature (for example 35° C.) by the radiator 62. The downstream side pipe 60B is provided with a third pump 64 for circulating the cooling water.

The third circulation route 60 further includes a bypass pipe 60C. The bypass pipe 60C is configured as a flow path bypassing the radiator 62, and is configured such that the path of cooling water circulating through the third circulation route 60 is configured by a path passing through the radiator 62, and a path passing through the bypass pipe 60C.

Interior Air Conditioning Unit 70

Figure 3:
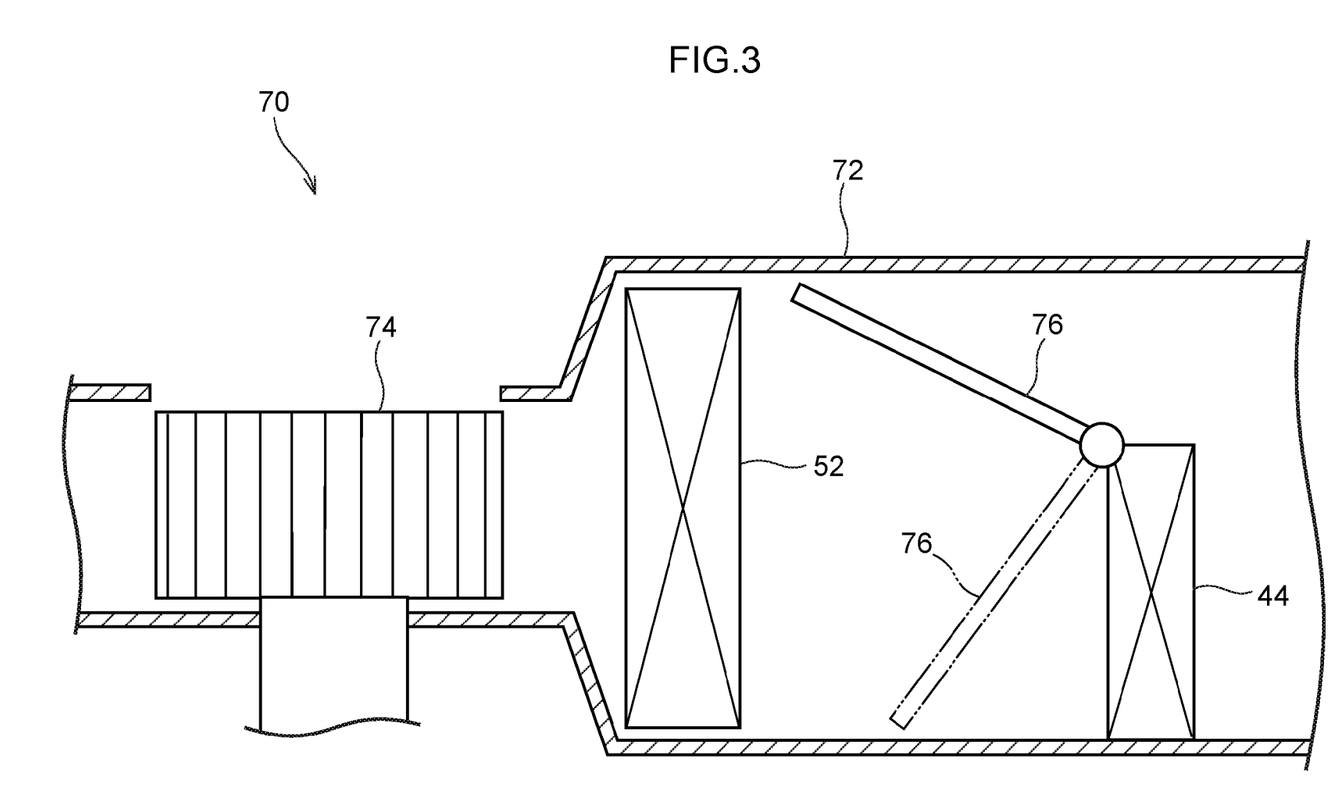
FIG. 3 is a schematic diagram illustrating an interior air conditioning unit employed in the adsorption heat pump-equipped vehicle air conditioning device illustrated in FIG. 1.

As illustrated in FIG. 3, the interior air conditioning unit 70 includes a ventilation duct 72. An air intake port for introducing outside air, and an air intake port for introducing inside air, not illustrated in the drawings, are provided at an upstream side of the ventilation duct 72. A blower 74 provided with a blower fan is provided inside the ventilation duct 72 at the upstream side, and configuration is made such that air introduced into the ventilation duct 72 through one or the other air intake port is conveyed toward the downstream side of the ventilation duct 72 by the blower 74.

The interior heat exchanger 52 for dehumidifying and cooling introduced air, the heater core 44 for heating the introduced air, and an air mixing damper 76 for regulating the airflow rate of introduced air to the heater core 44 are respectively provided in the ventilation duct 72 further to the downstream side than the blower 74. Operating the air mixing damper 76 in the state illustrated by double-dotted intermittent lines in FIG. 3 enables the ventilation duct 72 to operate as a first path for air that passes the interior heat exchanger 52. Operating the air mixing damper 76 in the state illustrated by solid lines in FIG. 3 enables the ventilation duct 72 to operate as a second path for air that has passed through the interior heat exchanger 52 and the heater core 44. Moreover, configuration is made such that air that has passed through the first path or the second path flows toward the downstream side of the ventilation duct 72 and is blown into the vehicle cabin.

Next, explanation follows regarding operation and advantageous effects of the present exemplary embodiment, while also explaining operation of the vehicle air conditioning device 10.

When Required to Cool

When required to cool, the controller 30 controls switching of the four-way valves 26A, 26B and the four-way valves 28A, 28B, such that on an adsorption process side, either the first adsorption core 22C or the second adsorption core 24C is connected to the third circulation route 60 through the four-way valves 26A, 26B, and on the adsorption process side, either the first evaporation and condensation core 22D or the second evaporation and condensation core 24D is connected to the second circulation route 50 through the four-way valves 28A, 28B. On a desorption process side, however, either the first adsorption core 22C or the second adsorption core 24C is connected to the first circulation route 40 through the four-way valves 26A, 26B, and on the desorption process side, either the first evaporation and condensation core 22D or the second evaporation and condensation core 24D is connected to the third circulation route 60 by the four-way valves 28A, 28B. In the interior air conditioning unit 70, the air mixing damper 76 is operated (see the air mixing damper 76 illustrated by double-dotted intermittent lines in FIG. 3) to configure the path through the ventilation duct 72 as the first path, through which flows air that has passed through the interior heat exchanger 52.

Specifically, as illustrated in FIG. 2, the first adsorption core 22C is connected to the third circulation route 60 through the four-way valves 26A, 26B, and the second evaporation and condensation core 24D is connected to the third circulation route 60 through the four-way valves 28A, 28B. A path is thereby formed circulating around the first adsorption core 22C, the radiator 62, and the second evaporation and condensation core 24D (see the arrows A in FIG. 2). The first evaporation and condensation core 22D is connected to the second circulation route 50 through the four-way valves 28A, 28B. A path is thereby formed circulating around the first evaporation and condensation core 22D and the interior heat exchanger 52 (see the arrows B in FIG. 2). The second adsorption core 24C is connected to the first circulation route 40 by the four-way valves 26A, 26B. A path is thereby formed circulating around the second adsorption core 24C and the first circulation route 40 (engine 42) (see the arrows C in FIG. 2).

An adsorption process is performed in the first vessel 22. Namely, in the first vessel 22, dried adsorbent 32 adsorbs refrigerant inside the first evaporation and condensation core 22D, reducing the pressure inside the first vessel 22 and thereby evaporating the refrigerant in the first evaporation and condensation section 22B. When this occurs, the cooling water inside the first evaporation and condensation core 22D is cooled by the latent heat of evaporation of the refrigerant. The cooling water flowing inside the second circulation route 50 is accordingly cooled to the cold temperature (for example 7° C.), and supplied to the interior heat exchanger 52. Cooled air is accordingly blown from the ventilation duct 72 into the vehicle cabin as a result.

A desorption process is performed in the second vessel 24. Namely, the second adsorption core 24C is connected to the first circulation route 40 through the four-way valves 26A, 26B, such that the adsorbent 32 inside the second adsorption section 24A is heated through the second adsorption core 24C. The adsorbent 32 inside the second adsorption section 24A is accordingly dried, and the refrigerant is desorbed from the adsorbent 32. Since the third circulation route 60 is connected to the second evaporation and condensation core 24D, the refrigerant desorbed from the adsorbent 32 is condensed in the second evaporation and condensation core 24D and is regenerated into liquid water.

In the adsorption heat pump 20, after the adsorption process in the first vessel 22 and after the desorption process in the second vessel 24, the four-way valves 26A, 26B and the four-way valves 28A, 28B are switched under the control of the controller 30, switching the first vessel 22 from the adsorption process to the desorption process, and switching the second vessel 24 from the desorption process to the adsorption process. Specifically, although not illustrated in the drawings, the first adsorption core 22C is connected to the first circulation route 40 through the four-way valves 26A, 26B, and the first evaporation and condensation core 22D is connected to the third circulation route 60 through the four-way valves 28A, 28B. On the other hand, the second adsorption core 24C is connected to the third circulation route 60 through the four-way valves 26A, 26B, and the second evaporation and condensation core 24D is connected to the second circulation route 50 through the four-way valves 28A, 28B. In this manner, the four-way valves 26A, 26B and the four-way valves 28A, 28B are switched under control of the controller 30 such that the adsorption process and the desorption process are respectively repeated in the first adsorption section 22A and the second adsorption section 24A, thereby supplying cold temperature cooling water in the second circulation route 50 to the interior heat exchanger 52.

When Required to Heat

When required to heat, the controller 30 controls switching of the four-way valves 26A, 26B and the four-way valves 28A, 28B, such that on the adsorption process side, either the first adsorption core 22C or the second adsorption core 24C is connected to the third circulation route 60 through the four-way valves 26A, 26B, and on the adsorption process side, either the first evaporation and condensation core 22D or the second evaporation and condensation core 24D is connected to the third circulation route 60 through the four-way valves 28A, 28B. On the desorption process side, either the first adsorption core 22C or the second adsorption core 24C is connected to the first circulation route 40 through the four-way valves 26A, 26B, and on the desorption process side, either the first evaporation and condensation core 22D or the second evaporation and condensation core 24D is connected to the second circulation route 50 through the four-way valves 28A, 28B. In the interior air conditioning unit 70, the air mixing damper 76 is operated (see the air mixing damper 76 illustrated by solid lines in FIG. 3) to configure the path through the ventilation duct 72 as the second path, through which flows air that has passed through the interior heat exchanger 52 and the heater core 44.

Specifically, as illustrated in FIG. 1, the first adsorption core 22C is connected to the third circulation route 60 through the four-way valves 26A, 26B, and the first evaporation and condensation core 22D is connected to the third circulation route 60 through the four-way valves 28A, 28B. A path is thereby formed circulating around the first adsorption core 22C, the radiator 62, and the first evaporation and condensation core 22D (see the arrows A in FIG. 1). The second evaporation and condensation core 24D is connected to the second circulation route 50 through the four-way valves 28A, 28B. A path is thereby formed circulating around the second evaporation and condensation core 24D and the interior heat exchanger 52 (see the arrows B in FIG. 1). The second adsorption core 24C is connected to the first circulation route 40 through the four-way valves 26A, 26B. A path is thereby formed circulating around the second adsorption core 24C and the first circulation route 40 (engine 42) (see the arrows C in FIG. 1).

The adsorption process is performed in the first vessel 22. Namely, in the first vessel 22, dried adsorbent 32 adsorbs refrigerant, reducing the pressure inside the first vessel 22 and thereby evaporating the refrigerant in the first evaporation and condensation section 22B. When this occurs, the cooling water inside the first evaporation and condensation core 22D is cooled by the latent heat of evaporation of the refrigerant. The cooling water flowing around the third circulation route 60 is thereby cooled to the cold temperature, and the cold temperature cooling water is supplied to the first adsorption core 22C.

The desorption process is performed in the second vessel 24. Specifically, the first circulation route 40 is connected to the second adsorption core 24C, and so the adsorbent 32 inside the second adsorption section 24A is heated through the second adsorption core 24C. The adsorbent 32 inside the second adsorption section 24A is accordingly dried, and the refrigerant is desorbed from the adsorbent 32. Since the second circulation route 50 is connected to the second evaporation and condensation core 24D, the refrigerant desorbed from the adsorbent 32 is condensed and regenerated into liquid water. When this occurs, the cooling water flowing in the second circulation route 50 is warmed by the heat of condensation generated by condensation of the refrigerant. The warmed cooling water is accordingly supplied to the interior heat exchanger 52.

In the adsorption heat pump 20, after the adsorption process in the first vessel 22 and after the desorption process in the second vessel 24, the four-way valves 26A, 26B and the four-way valves 28A, 28B are switched, thereby switching the first vessel 22 from the adsorption process to the desorption process, and switching the second vessel 24 from the desorption process to the adsorption process. Specifically, although not illustrated in the drawings, the first adsorption core 22C is connected to the first circulation route 40 through the four-way valves 26A, 26B, and the first evaporation and condensation core 22D is connected to the second circulation route 50 through the four-way valves 28A, 28B. The second adsorption core 24C is connected to the third circulation route 60 through the four-way valves 26A, 26B, and the second evaporation and condensation core 24D is connected to the third circulation route 60 through the four-way valves 28A, 28B. In this manner, the four-way valves 26A, 26B and the four-way valves 28A, 28B are switched under the control of the controller 30 such that the adsorption process and the desorption process are respectively repeated in the first adsorption section 22A and the second adsorption section 24A, thereby supplying warmed cooling water to the interior heat exchanger 52.

Thus, according to the vehicle air conditioning device 10 of the first exemplary embodiment, when required to heat, on the desorption process side, either the first adsorption core 22C or the second adsorption core 24C is connected to the first circulation route 40, and on the desorption process side, either the first evaporation and condensation core 22D or the second evaporation and condensation core 24D is connected to the second circulation route 50. This thereby enables the cooling water inside the second circulation route 50 that has been warmed by the heat of condensation generated by the refrigerant during the desorption process to be supplied to the interior heat exchanger 52. This thereby enables the heat of condensation to be utilized as an auxiliary heat source when required to heat. Namely, when required to heat, the heat of condensation can be utilized as an auxiliary heat source in addition to the engine 42 (high temperature heat source). This thereby enables improved heating efficiency by the vehicle air conditioning device 10.

According to the vehicle air conditioning device 10 configured as described above, when switching from being required to cool to being required to heat, on the desorption process side, either the first evaporation and condensation core 22D or the second evaporation and condensation core 24D can be connected to the second circulation route 50 by switching the four-way valves 26A, 26B or the four-way valves 28A, 28B. This thereby enables the heating efficiency of the vehicle air conditioning device 10 to be improved with a simple configuration. Explanation follows regarding this point.

Namely, as described above, when switching from the cooling required state in which the adsorption process is performed in the first vessel 22 and the desorption process is performed in the second vessel 24, to the heating required state in which the adsorption process is performed in the first vessel 22 and the desorption process is performed in the second vessel 24, the second evaporation and condensation core 24D on the desorption process side can be connected to the second circulation route 50 by switching the four-way valves 28A, 28B. On the other hand, when switching from the cooling required state in which the adsorption process is performed in the first vessel 22 and the desorption process is performed in the second vessel 24 to the heating required state in which the desorption process is performed in the first vessel 22 and the adsorption process is performed in the second vessel 24, the first vessel 22 can be switched to the desorption process, and the first evaporation and condensation core 22D on the desorption process side can be connected to the second circulation route 50, by switching the four-way valves 26A, 26B. In this manner, when switching from being required to cool to being required to heat, on the desorption process side, either the first evaporation and condensation core 22D or the second evaporation and condensation core 24D can be connected to the second circulation route 50 by switching the four-way valves 26A, 26B or the four-way valves 28A, 28B. The switch from being required to cool to being required to heat is accordingly accomplished with a simple configuration, thereby the heating efficiency of the vehicle air conditioning device 10 to be improved.

The switching valves that switch the processes of the first vessel 22 and the second vessel 24 are configured by the four-way valves 26A, 26B and the four-way valves 28A, 28B. This thereby enables the processes of the first vessel 22 and the second vessel 24 to be switched with a simple configuration.

Second Exemplary Embodiment

Figure 4:
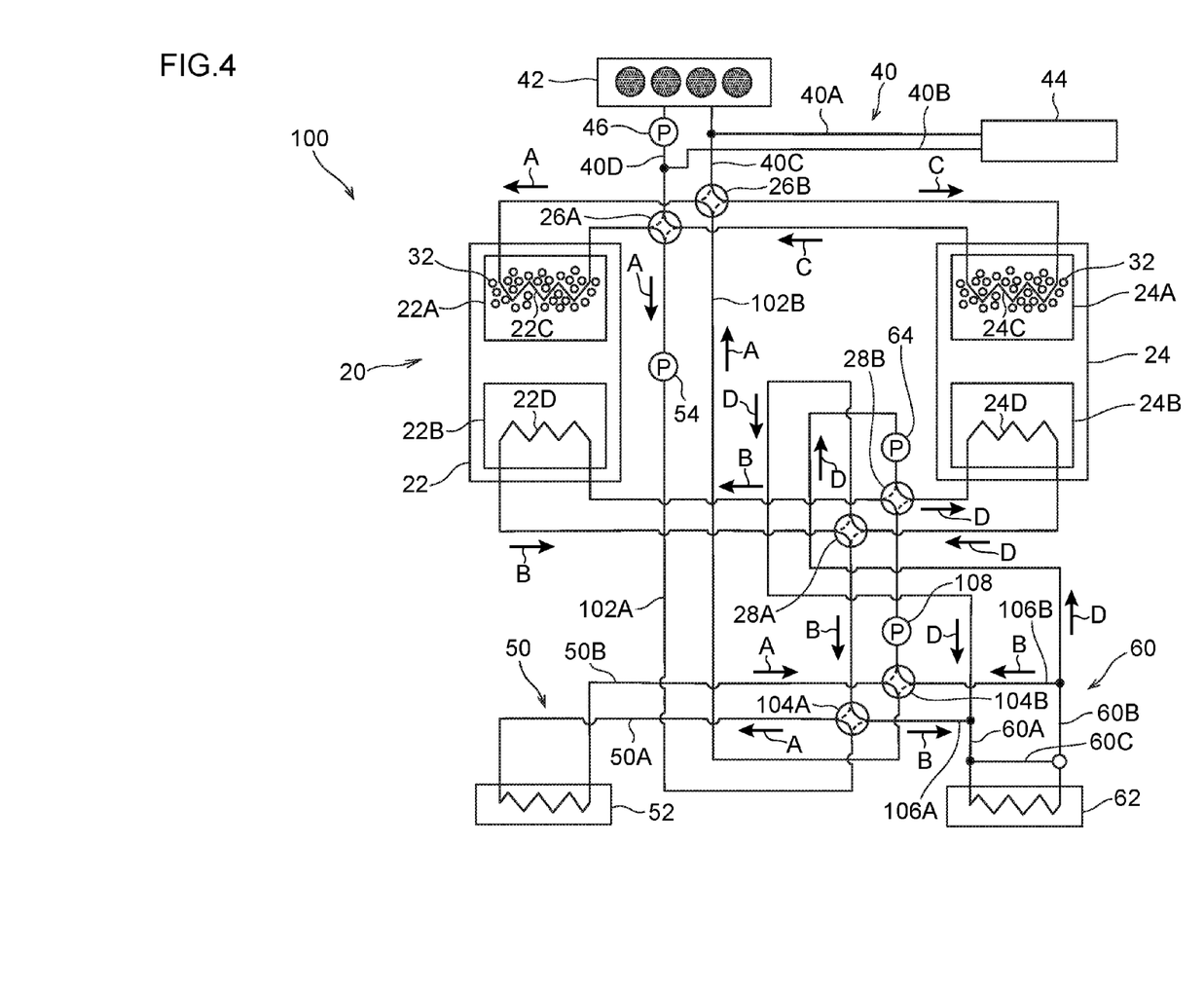
FIG. 4 is a configuration diagram illustrating a state of an adsorption heat pump-equipped vehicle air conditioning device according to a second exemplary embodiment when required to heat.
Figure 5:
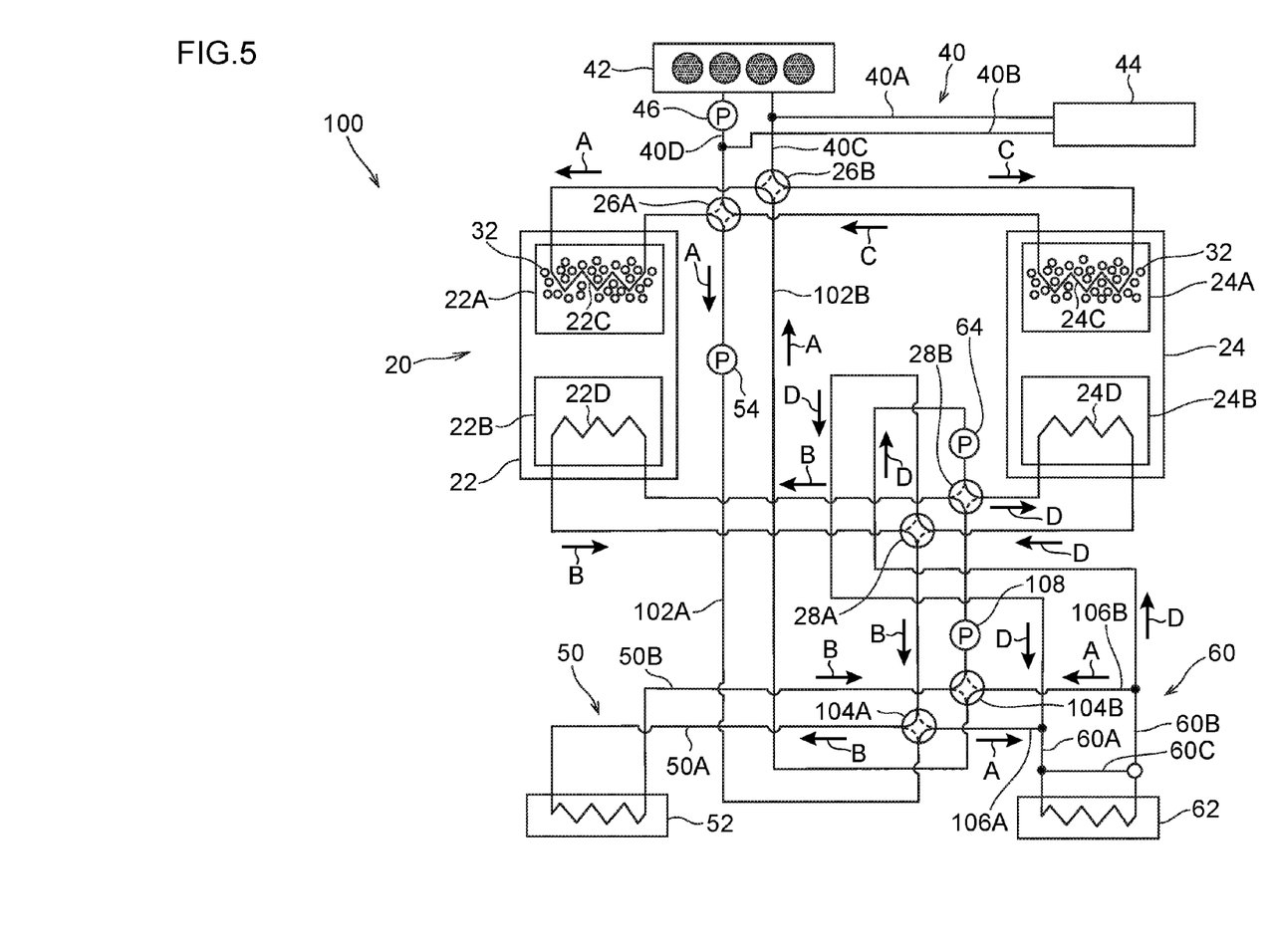
FIG. 5 is a configuration diagram illustrating a state of the adsorption heat pump-equipped vehicle air conditioning device illustrated in FIG. 4 when required to cool.

Explanation follows regarding a vehicle air conditioning device 100 of a second exemplary embodiment, with reference to FIG. 4 and FIG. 5. The second exemplary embodiment is configured similarly to the first exemplary embodiment, with the exception of the following points. In the following explanation, members configured similarly to those of the first exemplary embodiment are allocated the same reference numerals.

In the vehicle air conditioning device 100 of the second exemplary embodiment, the four-way valve 26A is coupled to a four-way valve 104A, serving as a "third switching valve", through a coupling pipe 102A (an element understood to fall under the broad definition of a "coupling portion"). The second pump 54 is provided at an intermediate portion of the coupling pipe 102A. The four-way valve 28B is coupled to a four-way valve 104B, serving as a "third switching valve", through a coupling pipe 102B (an element understood to fall under the broad definition of a "coupling portion"). The second circulation route 50 is connected to the four-way valves 104A, 104B. The controller 30 (not illustrated in the drawings) is electrically connected to the four-way valves 104A, 104B, and the controller 30 controls switching of the four-way valves 104A, 104B.

In the second exemplary embodiment, the first evaporation and condensation core 22D, the second evaporation and condensation core 24D, and the third circulation route 60 are connected to the four-way valves 28A, 28B. The vehicle air conditioning device 100 further includes a pair of coupling pipes 106A, 106B (elements understood to fall under the broad definition of a "coupling portion") that branch from the third circulation route 60 and are connected to the four-way valves 28A, 28B. The coupling pipe 106A couples together the four-way valve 28A and a portion of the third circulation route 60 on the upstream side of the radiator 62, and the four-way valve 104A is connected to an intermediate portion of the coupling pipe 106A. The coupling pipe 106B couples together the four-way valve 28B and a portion of the third circulation route 60 on the downstream side of the radiator 62, and the four-way valve 104B is connected to an intermediate portion of the coupling pipe 106B. The four-way valves 104A, 104B are thereby connected to the third circulation route 60, and are coupled to the four-way valves 28A, 28B through the coupling pipes 106A, 106B. Moreover, a fourth pump 108 for circulating cooling water is provided to the coupling pipe 106B at a position on the downstream side of the four-way valve 28B.

Next, explanation follows regarding operation of the vehicle air conditioning device 100.

When Required to Cool

When required to cool, the controller 30 controls the four-way valves 26A, 26B, the four-way valves 28A, 28B, and the four-way valves 104A, 104B such that on the adsorption process side, either the first adsorption core 22C or the second adsorption core 24C is connected to the third circulation route 60, and on the adsorption process side, either the first evaporation and condensation core 22D or the second evaporation and condensation core 24D is connected to the second circulation route 50. On the desorption process side, either the first adsorption core 22C or the second adsorption core 24C is connected to the first circulation route 40, and on the desorption process side, either the first evaporation and condensation core 22D or the second evaporation and condensation core 24D is connected to the third circulation route 60. In the interior air conditioning unit 70 the air mixing damper 76 is operated to configure the path through the ventilation duct 72 as the first path, through which flows air that has passed through the interior heat exchanger 52.

Specifically, as illustrated in FIG. 5, the first adsorption core 22C is connected to the third circulation route 60 through the four-way valves 26A, 26B and the four-way valves 104A, 104B. A path is thereby formed circulating around the first adsorption core 22C and the radiator 62 (see the arrows A in FIG. 5). The first evaporation and condensation core 22D is connected to the second circulation route 50 through the four-way valves 28A, 28B and the four-way valves 104A, 104B. A path is thereby formed circulating around the first evaporation and condensation core 22D and the interior heat exchanger 52 (see the arrows B in FIG. 5). The second adsorption core 24C in which the desorption process is being performed is connected to the first circulation route 40 through the four-way valves 26A, 26B. A path is thereby formed circulating around the second adsorption core 24C and the first circulation route 40 (engine 42) (see the arrows C in FIG. 5). Furthermore, the second evaporation and condensation core 24D is connected to the third circulation route 60 through the four-way valves 28A, 28B. A path is thereby formed circulating around the second evaporation and condensation core 24D and the radiator 62 (see the arrows D in FIG. 5).

The adsorption process is performed in the first vessel 22. Namely, in the first vessel 22, dried adsorbent 32 adsorbs refrigerant from the first evaporation and condensation core 22D, reducing the pressure inside the first vessel 22 and thereby evaporating the refrigerant in the first evaporation and condensation section 22B. When this occurs, the cooling water inside the first evaporation and condensation core 22D is cooled by the latent heat of evaporation of the refrigerant. The cooling water flowing in the second circulation route 50 is accordingly cooled to the cold temperature (for example 7° C.), and supplied to the interior heat exchanger 52. Cooled air is accordingly blown from the ventilation duct 72 into the vehicle cabin as a result.

The desorption process is performed in the second vessel 24. Specifically, the second adsorption core 24C is connected to the first circulation route 40 through the four-way valves 26A, 26B, such that the adsorbent 32 inside the second adsorption section 24A is heated through the second adsorption core 24C. The adsorbent 32 inside the second adsorption section 24A is accordingly dried, and the refrigerant is desorbed from the adsorbent 32. Since the third circulation route 60 is connected to the second evaporation and condensation core 24D, the refrigerant desorbed from the adsorbent 32 is condensed in the second evaporation and condensation core 24D and is regenerated into liquid water.

In the vehicle air conditioning device 100 of the second exemplary embodiment, after the adsorption process in the first vessel 22 and after the desorption process in the second vessel 24, the four-way valves 26A, 26B and the four-way valves 28A, 28B are switched under the control of the controller 30, switching the first vessel 22 from the adsorption process to the desorption process, and switching the second vessel 24 from the desorption process to the adsorption process. Specifically, although not illustrated in the drawings, the first adsorption core 22C is connected to the first circulation route 40 through the four-way valves 26A, 26B, and the first evaporation and condensation core 22D is connected to the third circulation route 60 through the four-way valves 28A, 28B. The second adsorption core 24C is connected to the third circulation route 60 through the four-way valves 26A, 26B and the four-way valves 104A, 104B, and the second evaporation and condensation core 24D is connected to the second circulation route 50 through the four-way valves 28A, 28B and the four-way valves 104A, 104B. In this manner, the adsorption process and the desorption process are respectively performed repeatedly in the first adsorption section 22A and the second adsorption section 24A, and cold temperature cooling water is supplied to the interior heat exchanger 52 through the second circulation route 50.

When Required to Heating

When required to heat, the controller 30 controls switching of the four-way valves 26A, 26B, the four-way valves 28A, 28B, and the four-way valves 104A, 104B, such that on the adsorption process side, either the first adsorption core 22C or the second adsorption core 24C is connected to the second circulation route 50, and on the adsorption process side, either the first evaporation and condensation core 22D or the second evaporation and condensation core 24D is connected to the third circulation route 60. On the desorption process side, either the first adsorption core 22C or the second adsorption core 24C is connected to the first circulation route 40, and on the desorption process side, either the first evaporation and condensation core 22D or the second evaporation and condensation core 24D is connected to the third circulation route 60. In the interior air conditioning unit 70, the air mixing damper 76 is operated to configure the path through the ventilation duct 72 as the second path, through which flows air that has passed through the interior heat exchanger 52 and the heater core 44.

Specifically, as illustrated in FIG. 4, the first adsorption core 22C is connected to the second circulation route 50 through the four-way valves 26A, 26B and the four-way valves 104A, 104B. A path is thereby formed circulating around the first adsorption core 22C and the interior heat exchanger 52 (see the arrows A in FIG. 4). The first evaporation and condensation core 22D is connected to the third circulation route 60 through the four-way valves 28A, 28B and the four-way valves 104A, 104B. A path is thereby formed circulating around the first evaporation and condensation core 22D and the radiator 62 (see the arrows B in FIG. 4). The second adsorption core 24C is connected to the first circulation route 40 through the four-way valves 26A, 26B. A path is thereby formed circulating around the second adsorption core 24C and the first circulation route 40 (engine 42) (see the arrows C in FIG. 4). The second evaporation and condensation core 24D is connected to the third circulation route 60 through the four-way valves 28A, 28B. A path is thereby formed circulating around the second evaporation and condensation core 24D and the radiator 62 (see the arrows D in FIG. 4).

The adsorption process is performed in the first vessel 22. Namely, in the first vessel 22, dried adsorbent 32 adsorbs the refrigerant, reducing the pressure inside the first vessel 22 and thereby evaporating the refrigerant in the first evaporation and condensation section 22B. When this occurs, the cooling water inside the first evaporation and condensation core 22D is cooled by the latent heat of evaporation of the refrigerant. The cooling water flowing around the third circulation route 60 is accordingly cooled to the cold temperature, and the cold temperature cooling water is supplied to the radiator 62. Moreover, in the first adsorption section 22A, the cooling water in the first adsorption core 22C is warmed by the heat of adsorption generated by the adsorbent 32 adsorbing the refrigerant. The warmed cooling water inside the first adsorption core 22C is accordingly supplied to the interior heat exchanger 52 through the second circulation route 50.

The desorption process is performed in the second vessel 24. Specifically, the first circulation route 40 is connected to the second adsorption core 24C through the four-way valves 26A, 26B, such that the adsorbent 32 inside the second adsorption section 24A is heated through the second adsorption core 24C. The adsorbent 32 inside the second adsorption section 24A is accordingly dried, and the refrigerant is desorbed from the adsorbent 32. Since the third circulation route 60 is connected to the second evaporation and condensation core 24D, the refrigerant desorbed from the adsorbent 32 is condensed in the second evaporation and condensation core 24D and regenerated into liquid water.

In the adsorption heat pump 20, after the adsorption process in the first vessel 22 and after the desorption process in the second vessel 24, the four-way valves 26A, 26B and the four-way valves 28A, 28B are switched, switching the first vessel 22 from the adsorption process to the desorption process, and switching the second vessel 24 from the desorption process to the adsorption process. Specifically, although not illustrated in the drawings, the first adsorption core 22C is connected to the first circulation route 40 through the four-way valves 26A, 26B, and the first evaporation and condensation core 22D is connected to the third circulation route 60 through the four-way valves 28A, 28B. The second adsorption core 24C is connected to the second circulation route 50 through the four-way valves 26A, 26B and the four-way valves 104A, 104B, and the second evaporation and condensation core 24D is connected to the third circulation route 60 through the four-way valves 28A, 28B and the four-way valves 104A, 104B. In this manner, the adsorption process and the desorption process are respectively performed repeatedly in the first adsorption section 22A and the second adsorption section 24A, thereby supplying warmed cooling water to the interior heat exchanger 52.

In this manner, in the vehicle air conditioning device 100 of the second exemplary embodiment, when required to heat, on the adsorption process side, either the first adsorption core 22C or the second adsorption core 24C is connected to the second circulation route 50. This thereby enables cooling water that has been warmed by the heat of adsorption generated by the adsorbent 32 during the adsorption process to be supplied to the interior heat exchanger 52 through the second circulation route 50. This thereby enables the heat of adsorption to be utilized as an auxiliary heat source when required to heat. Namely, when required to heat, the heat of adsorption can be utilized as an auxiliary heat source in addition to the high temperature heat source (engine 42). This thereby enables improved heating efficiency in the vehicle air conditioning device 10 of the second exemplary embodiment.

Switching Auxiliary Heat Sources when Required to Heat in the Second Exemplary Embodiment In the second exemplary embodiment described above, when required to heat, the heat of adsorption is utilized as an auxiliary heat source. However, configuration may be made such that the controller 30 controls switching of the four-way valves 28A, 28B and the four-way valves 104A, 104B such that the heat of condensation is utilized as an auxiliary heat source, similarly to in the first exemplary embodiment. In such cases, on the adsorption process side, either the first adsorption core 22C or the second adsorption core 24C is connected to the third circulation route 60, and on the adsorption process side, either the first evaporation and condensation core 22D or the second evaporation and condensation core 24D is connected to the third circulation route 60. On the desorption process side, either the first adsorption core 22C or the second adsorption core 24C is connected to the first circulation route 40, and on the desorption process side, either the first evaporation and condensation core 22D or the second evaporation and condensation core 24D is connected to the second circulation route 50. The state of the interior air conditioning unit 70 is a similar state to the state in the second exemplary embodiment.

Figure 6:
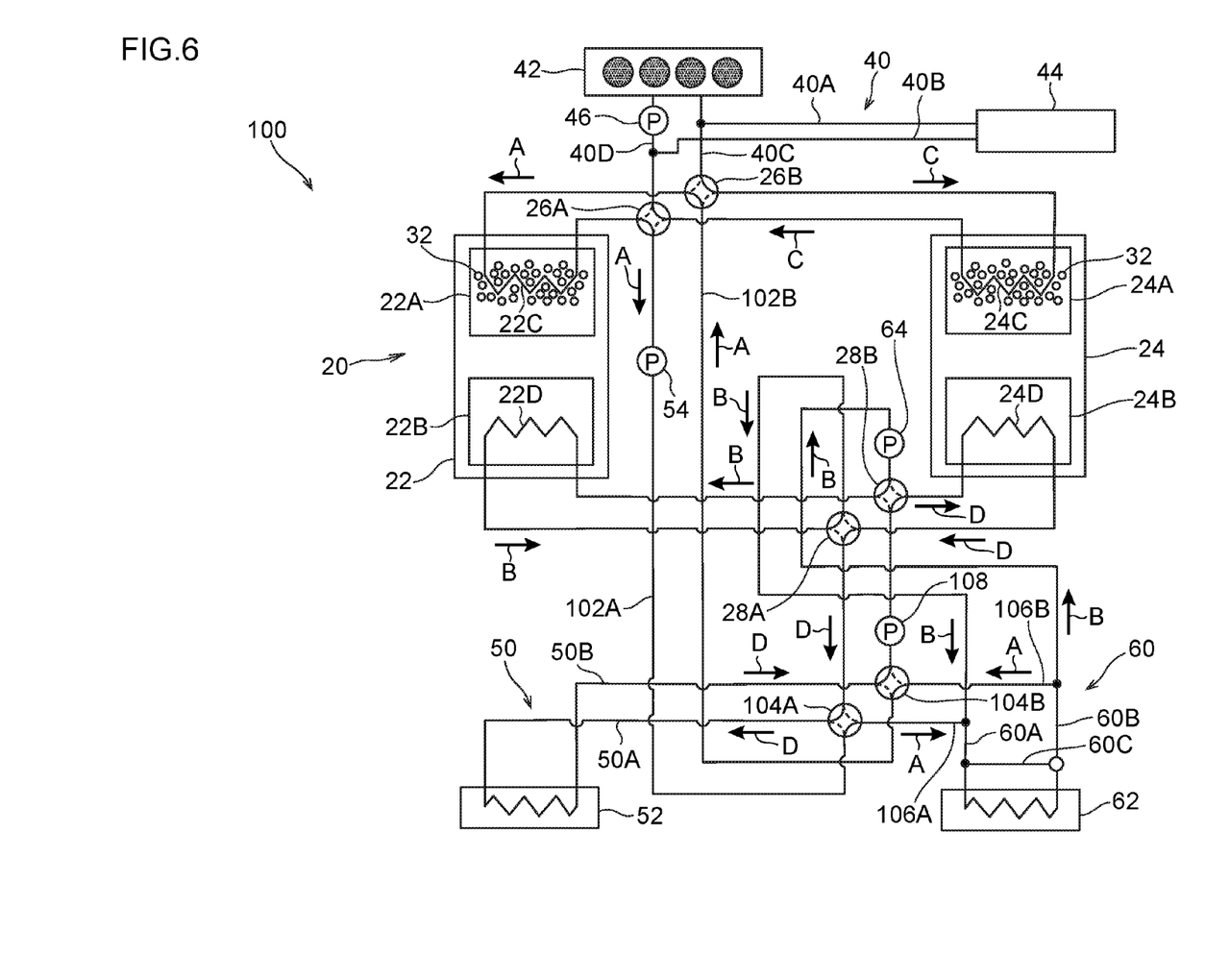
FIG. 6 is a configuration diagram illustrating a state in which the connection state illustrated in FIG. 4 has been switched using four-way valves.

Specifically, as illustrated in FIG. 6, the first adsorption core 22C is connected to the third circulation route 60 through the four-way valves 26A, 26B and the four-way valves 104A, 104B. A path is thereby formed circulating around the first adsorption core 22C and the radiator 62 (see the arrows A in FIG. 6). The first evaporation and condensation core 22D is connected to the third circulation route 60 through the four-way valves 28A, 28B. A path is thereby formed circulating around the first evaporation and condensation core 22D and the radiator 62 (see the arrows B in FIG. 6). Furthermore, the second adsorption core 24C is connected to the first circulation route 40 through the four-way valves 26A, 26B. A path is thereby formed circulating around the second adsorption core 24C and the first circulation route 40 (engine 42) (see the arrows C in FIG. 6). Moreover, the second evaporation and condensation core 24D is connected to the second circulation route 50 through the four-way valves 28A, 28B and the four-way valves 104A, 104B. A path is thereby formed circulating around the second evaporation and condensation core 24D and the interior heat exchanger 52 (see the arrows D in FIG. 6).

The adsorption process is performed in the first vessel 22. Namely, in the first vessel 22, dried adsorbent 32 adsorbs the refrigerant, reducing the pressure inside the first vessel 22 and thereby evaporating the refrigerant in the first evaporation and condensation section 22B. When this occurs, the cooling water inside the first evaporation and condensation core 22D is cooled by the latent heat of evaporation of the refrigerant. The cooling water flowing around the third circulation route 60 is accordingly cooled to the cold temperature, and the cold temperature cooling water is supplied to the radiator 62. Moreover, in the first adsorption section 22A, the cooling water in the first adsorption core 22C is warmed by the heat of adsorption generated by the adsorbent 32 adsorbing the refrigerant. The warmed cooling water inside the first adsorption core 22C is accordingly supplied to the radiator 62 through the third circulation route 60.

The desorption process is performed in the second vessel 24. Specifically, the first circulation route 40 is connected to the second adsorption core 24C through the four-way valves 26A, 26B, such that the adsorbent 32 inside the second adsorption section 24A is heated through the second adsorption core 24C. The adsorbent 32 inside the second adsorption section 24A is accordingly dried, and the refrigerant is desorbed from the adsorbent 32. Since the second circulation route 50 is connected to the second evaporation and condensation core 24D, the cooling water is supplied to the interior heat exchanger 52, and the refrigerant desorbed from the adsorbent 32 is condensed and regenerated into liquid water.

In the adsorption heat pump 20, after the adsorption process in the first vessel 22 and after the desorption process in the second vessel 24, the four-way valves 26A, 26B and the four-way valves 28A, 28B are switched, switching the first vessel 22 from the adsorption process to the desorption process, and switching the second vessel 24 from the desorption process to the adsorption process. Specifically, although not illustrated in the drawings, the first adsorption core 22C is connected to the first circulation route 40 through the four-way valves 26A, 26B, and the first evaporation and condensation core 22D is connected to the second circulation route 50 through the four-way valves 28A, 28B and the four-way valves 104A, 104B. The second adsorption core 24C is connected to the third circulation route 60 through the four-way valves 26A, 26B and the four-way valves 104A, 104B, and the second evaporation and condensation core 24D is connected to the third circulation route 60 through the four-way valves 28A, 28B. In this manner, the adsorption process and the desorption process are respectively performed repeatedly in the first adsorption section 22A and the second adsorption section 24A, thereby supplying warmed cooling water to the interior heat exchanger 52.

In this manner, in the connection state illustrated in FIG. 6, when required to heat, on the desorption process side, either the first evaporation and condensation core 22D or the second evaporation and condensation core 24D is connected to the second circulation route 50. This thereby enables cooling water in the second circulation route 50 that has been warmed by the heat of condensation generated by the refrigerant during the desorption process to be supplied to the interior heat exchanger 52. This thereby enables the heat of condensation to be utilized as an auxiliary heat source when required to heat. Namely, when required to heat, the heat of condensation can be utilized as an auxiliary heat source in addition to the engine 42 (high temperature heat source). This thereby enables improved heating efficiency in the vehicle air conditioning device 100.

In the connection state illustrated in FIG. 6, by switching the four-way valves 28A, 28B and the four-way valves 104A, 104B from the connection state illustrated in FIG. 4, on the desorption process side, either the first evaporation and condensation core 22D or the second evaporation and condensation core 24D can be connected to the second circulation route 50. Since heat of adsorption has a greater heat amount than the heat of condensation, a temperature difference can be brought about in the cooling water supplied to the interior heat exchanger 52. Accordingly, switching the four-way valves 28A, 28B and the four-way valves 104A, 104B according to the usage environment enables adjustment of heating intensity to be achieved with a simple configuration.

By switching the four-way valves 104A, 104B, the vehicle air conditioning device 100 configured as described above can be switched from the cooling state illustrated in FIG. 5 to the heating state illustrated in FIG. 4 that utilizes heat of adsorption as an auxiliary heat source. Moreover, by switching the four-way valves 28A, 28B, the cooling state illustrated in FIG. 5 can be switched to the heating state illustrated in FIG. 6 that utilizes heat of condensation as an auxiliary heat source. This thereby enables the heating efficiency of the vehicle air conditioning device 100 to be improved with a simple configuration.

The invention claimed is:

1. An adsorption heat pump-equipped vehicle air conditioning device comprising:
    an adsorption heat pump that includes a plurality of vessels, each of which includes an adsorption section housing an adsorbent and an evaporation and condensation section inside of which a refrigerant is sealed, an adsorption process and a desorption process being performed repeatedly inside the vessels;
    first heat exchangers respectively disposed inside each of the adsorption sections;
    second heat exchangers respectively disposed inside each of the evaporation and condensation sections;
    a first circulation route for circulating the refrigerant between a high temperature heat source and a heater core;
    a second circulation route for circulating the refrigerant between the adsorption heat pump and an interior heat exchanger;
    a switching valve through which the second circulation route is connected to the adsorption heat pump; and
    a controller that controls switching of the switching valve, and that, when required to heat with the interior heat exchanger, selectively (i) connects the second heat exchanger of at least one of the vessels performing the desorption process to the second circulation route through the switching valve, or (ii) connects the first heat exchanger of at least one of the vessels performing the adsorption process to the second circulation route through the switching valve.

2. The adsorption heat pump-equipped vehicle air conditioning device of claim 1, further comprising a third circulation route for circulating the refrigerant between the adsorption heat pump and a radiator, the third circulation route being connected to the adsorption heat pump through the switching valve, wherein:
    the switching valve includes a first switching valve that connects to the first heat exchangers, and a second switching valve that connects to the second heat exchangers;
    when required to cool with the interior heat exchanger, the controller connects the first heat exchanger of the at least one of the vessels performing the adsorption process to the third circulation route through the first switching valve and connects the second heat exchanger of the at least one of the vessels performing the adsorption process to the second circulation route through the second switching valve, and also connects the first heat exchanger of the at least one of the vessels performing the desorption process to the first circulation route through the first switching valve and connects the second heat exchanger of the at least one of the vessels performing the desorption process to the third circulation route through the second switching valve; and
    when required to heat with the interior heat exchanger, the controller connects the first heat exchanger and the second heat exchanger of the at least one of the vessels performing the adsorption process to the third circulation route through the first switching valve and the second switching valve, and also connects the first heat exchanger of the at least one of the vessels performing the desorption process to the first circulation route through the first switching valve and connects the second heat exchanger of the at least one of the vessels performing the desorption process to the second circulation route through the second switching valve.

3. The adsorption heat pump-equipped vehicle air conditioning device of claim 1, further comprising a third circulation route for circulating the refrigerant between the adsorption heat pump and a radiator, the third circulation route being connected to the adsorption heat pump through the switching valve, wherein:
    the switching valve includes a first switching valve that is connected to the first heat exchangers, a second switching valve that is connected to the second heat exchangers, and a third switching valve that is coupled to the first switching valve and the second switching valve;

when required to cool with the interior heat exchanger, the controller connects the first heat exchanger of the at least one of the vessels performing the adsorption process to the third circulation route through the first switching valve and the third switching valve and connects the second heat exchanger of the at least one of the vessels performing the adsorption process to the second circulation route through the second switching valve and the third switching valve, and also connects the first heat exchanger of the at least one of the vessels performing the desorption process to the first circulation route through the first switching valve and connects the second heat exchanger of the at least one of the vessels performing the desorption process to the third circulation route through the second switching valve; and when required to heat with the interior heat exchanger, the controller connects the first heat exchanger of the at least one of the vessels performing the adsorption process to the second circulation route through the first switching valve and the third switching valve and connects the second heat exchanger of the at least one of the vessels performing the adsorption process to the third circulation route through the second switching valve and the third switching valve, and also connects the first heat exchanger of the at least one of the vessels performing the desorption process to the first circulation route through the first switching valve and connects the second heat exchanger of the at least one of the vessels performing the desorption process to the third circulation route through the second switching valve.

4. The adsorption heat pump-equipped vehicle air conditioning device of claim 3, wherein, when required to heat with the interior heat exchanger, the controller switches the second switching valve and the third switching valve so as to connect the first heat exchanger of the at least one of the vessels performing the adsorption process to the third circulation route through the first switching valve and the third switching valve and so as to connect the second heat exchanger of the at least one of the vessels performing the adsorption process to the third circulation route through the second switching valve, and also so as to connect the first heat exchanger of the at least one of the vessels performing the desorption process to the first circulation route through the first switching valve and so as to connect the second heat exchanger of the at least one of the vessels performing the desorption process to the second circulation route through the second switching valve and the third switching valve.

5. The adsorption heat pump-equipped vehicle air conditioning device of claim 1, wherein the switching valve is configured by a four-way valve.

* * * * *